United States Patent Office 3,360,362
Patented Dec. 26, 1967

3,360,362
DEZINCING OF LEAD
Thomas Ronald Albert Davey, Glen Waverley, Victoria, Australia, assignor to Metallurgical Processes Limited, Nassau, Bahamas, a company of Bahamas, and Imperial Smelting Corporation (N.S.C.) Limited, London, England, a British company, both doing business as Metallurgical Development Company, Nassau, Bahamas
Filed Oct. 14, 1964, Ser. No. 403,807
Claims priority, application Great Britain,
Oct. 18, 1963, 41,194/63
9 Claims. (Cl. 75—78)

ABSTRACT OF THE DISCLOSURE

The present disclosure relates to a method of recovering high purity molten zinc from a body of molten lead relatively rich in molten zinc, by cooling the zinc rich lead to cause zinc to float to the surface of the lead from which the zinc is vacuum distilled.

This invention relates to the dezincing of lead which contains dissolved zinc, such as, for example, the lead leaving the condenser system of a zinc blast furnace.

The invention consists in a method of dezincing molten lead comprising the steps of continuously supplying molten lead which contains dissolved zinc to an enclosed region in which the lead is cooled to throw zinc out of solution and to forming a zinc-rich molten layer on top of the body of molten lead, continuously evaporating zinc from the zinc-rich layer and removing molten lead continuously from the lower part of the enclosed region.

Preferably the lead is supplied immediately below the zinc-rich layer and is cooled in the lower part of the enclosed region.

The invention further consists in an apparatus for dezincing lead comprising an inner cylindrical vessel open at the bottom, an outer cylinder vessel of larger diameter than the first open at the top and in which the inner vessel dips, a zinc vapour offtake at the top of the inner vessel, a zinc condenser connected to the offtake, a vacuum line connected to the condenser, a vacuum pump connected to the vacuum line, a tangentially directed lead inlet duct adjacent the top of the inner vessel and cooling means for the lead adjacent the bottom of the inner vessel.

The invention will be further described with reference to the accompanying drawings.

Figure 1:
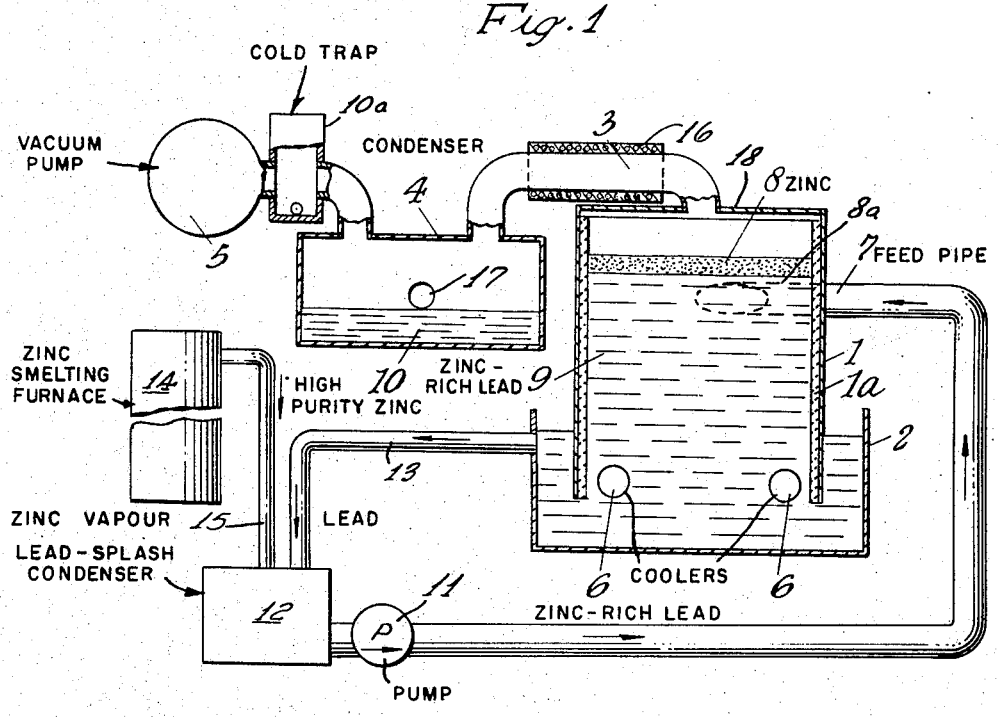
Figure 2:
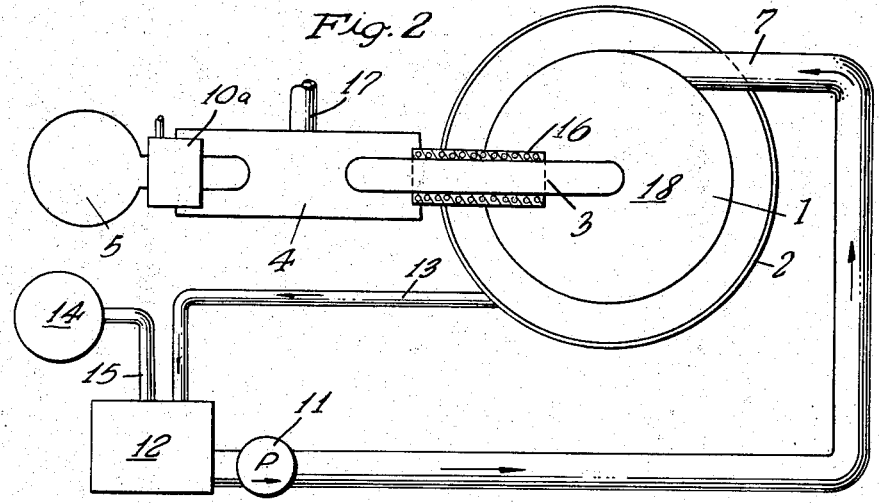

FIGURE 1 is a schematic sectional lay-out of an apparatus according to the invention; and
FIGURE 2 is a plan view.

In the drawing is shown an inner cylindrical vessel 1 open at the bottom mounted by means not shown so as to dip into an outer cylindrical vessel 2. The top of the inner vessel 1 is connected via a pipe 3 to a zinc condenser 4 which may be of any suitable form which is in turn connected to a vacuum pump 5.

Cooling means 6 are mounted near the bottom of the outer vessel 2 and feed pipe 7 is connected to enter the vessel 1 tangentially towards the top.

The dotted band 8 represents a layer of molten zinc near the top of the inner vessel 1 of say 95% zinc 5% lead below which is the zinc-rich molten lead layer 9.

A layer of molten zinc 10 is shown in the condenser.

In the operation of this apparatus, molten lead, which contains dissolved zinc, and usually some cadmium flows into the inner vessel from the sump of a lead pump in a lead-splash condenser 12 circuit, such as disclosed, for example, in U.S. Patent 2,668,047 of February 2, 1954. The zinc-rich lead is produced in primary condenser 12, by condensation on the circulating lead, of zinc vapour containing some lead and usually some cadmuim, which has been produced in zinc blast furnace 14 and is conducted from the top of the furnace via conduit 15 to the lead-splash condenser 12.

The zinc-rich lead enters via the tangential inlet duct 7, just below the lead/zinc interface and gives up some of its sensible heat to the zinc layer 8, this heat being dissipated as latent heat of evaporation of zinc. At the same time the lead takes up some zinc from the zinc layer. This is a more or less instantaneous heat transfer in the turbulent zone around the interface. The lead then flows downwards through the cylindrical vessel 1 with relatively little heat loss until it reaches a level near the bottom of the vessel 1 where the coolers 6 are situated. The vessel 1 is lined with a suitable refractory brickwork lining 1a and the coolers may be of any known type, e.g. coils or water cooled sections in the walls of the vessel. Zinc separates from the molten lead and the droplets of zinc rise countercurrent to the downward-flowing lead stream so as to form the layer 8 of substantially pure zinc on top of the lead. Thus, on top of the lead, there collects a layer of zinc containing up to about 5% of lead. This layer is being continuously evaporated by application of vacuum at the duct 3 and the zinc vapour passes to the zinc condenser 4 of a known type. Any zinc vapour not condensed at 10 is removed in a cold-trap 10a so as to avoid damage to the vacuum pump 5. The cooled molten lead leaving the inner vessel 1 passes under the bottom rim of the cylinder and into the outer vessel 2. From here it overflows at a constant rate into a conduit 13 and is returned to the lead-splash condenser system 12 to be used for further condensation of zinc vapour condensed molten zinc leaves the secondary condenser 4 through an outlet 17. The lead inlet point, or feed pipe 7, is situated at such a level that the input lead enters the vessel tangentially just below the lead/zinc interface 8a. Thus there is considerable turbulence at the zinc/lead interface and slight turbulence at the top surface of the layer of molten zinc zinc-rich (from which the evaporation occurs). The temperature of the input lead will normally be in the range 550°–600° C. and the temperature of the lead leaving the bottom of the vessel 2 will be about 450°–550° C. The temperature of the zinc condenser 4 will be maintained at about 420°–430° C.

Evaporation takes place from a substantially pure zinc layer instead of from a dilute solution of zinc in lead. This leads to the following advantages over previously described applications.

(a) A purer zinc vapour is formed and this means a higher grade of condensed zinc product.

(b) A smaller surface area is required for evaporation, i.e. elaborate spreading means are not required.

(c) A lesser degree of vacuum is necessary to evaporate zinc. This reduces the practical difficulties of providing a very high vacuum in the system.

The vacuum line 3 to the condenser, by any suitable means 16, should be heated to prevent condensation of solid zinc there. The top 18 of the vacuum chamber should be removable to give access, for dross removal from the zinc surface.

The entire vacuum cylinder should be removable from the bath, for ease of cleaning the bath and the cylinder.

Various modifications may be made in accordance with the invention. Thus while a single-stage condenser has been shown for the sake of simplicity, this may, however, consist of a series of stages, the first of which condenses a relatively lead-rich zinc, the second a very pure zinc and the third, a relatively cadmium-rich zinc. It may also be of advantage to allow a small amount of refluxing above the evaporating surface, so that a small amount of zinc containing most of the lead from the vapour condenses and falls back into the bath before entering the vacuum line to the condenser.

I claim:
1. In the method of recovering high purity molten zinc from a body of molten lead, rich in zinc dissolved in the lead, by distilling the lower boiling point zinc from the higher boiling point lead while maintaining the lead in its molten form, and separately condensing the resulting zinc vapour to molten zinc, the improvement in combination therewith which comprises:
   (a) a stream of the molten lead, rich in zinc, is passed into a confined lead-zinc separating zone to form an upright column;
   (b) the stream of zinc-rich molten lead is fed into the upper portion of the column;
   (c) the quiescent lower portion of the molten column is cooled to the point at which droplets of zinc separate from the molten lead;
   (d) the droplets of separated zinc are permitted to rise upwardly in the column and to form a layer of molten zinc, lean in lead, on the top of the column;
   (e) cooled molten lead, de-nuded of zinc, is withdrawn from the bottom of the column of molten lead;
   (f) the layer of molten zinc, lean in lead, is subjected in situ to vacuum distillation to drive off high-purity zinc vapour while leaving the molten lead behind;
   (g) the resulting high purity zinc vapour is passed to its own condensing zone and condensed to molten zinc; and
   (h) the resulting high purity molten zinc is withdrawn as such from the condensing zone.

2. Method according to claim 1, in which the stream of zinc-rich molten lead is fed tangentially into the upper portion of the column to cause considerable turbulence at the interface between the top of the column of molten lead and the bottom of the layer of molten zinc, lean in lead, on the top of the column of molten lead and only slight turbulence at the top surface of the layer of molten zinc, lean in lead, to facilitate abstraction of lead from the layer of molten zinc into the column of molten lead.

3. Method according to claim 1, in which the vacuum distilled high purity zinc vapour is subjected to reflux condensation as it leaves the molten zinc-lead layer so that a small amount of zinc containing most of the lead from the vapour condenses and falls back into the molten zinc layer before entering the vacuum line to the condensing zone.

4. Method according to claim 1, in which the vacuum distilled high purity zinc vapour is heated during its passage to the condensing zone to prevent condensation thereof to solid zinc.

5. Method according to claim 1, in which vacuum distilled high purity zinc vapour not condensed to molten zinc in the condensing zone is passed into a cold trap to effect condensation thereof and hence to prevent passage of that vapour to the source of vacuum.

6. Method according to claim 1, in which the stream of zinc-rich molten lead comes from a primary condensing zone.

7. Method according to claim 1, in which the stream of zinc-rich molten lead comes from a primary lead-splash condensing zone and is pumped under pressure into the upper portion of the column.

8. Method according to claim 1, in which the stream of zinc-rich molten lead comes from a primary lead-splash condensing zone and is pumped under pressure into the upper portion of the column; and the cooled molten lead, de-nuded of zinc, is withdrawn from the bottom of the column and passed back into the primary lead-splash condensing zone for reuse.

9. Method according to claim 1, in which the stream of molten lead, rich in zinc, is passed continuously into the upper portion of the molten lead in the separating zone; vacuum distilled high purity zinc vapour is passed continuously from the top of the molten layer of molten zinc, lean in lead, into its own condensing zone; and cooled molten lead, de-nuded of zinc, is withdrawn continuously from the bottom of the column of molten lead.

References Cited

UNITED STATES PATENTS

| | | | |
|---|---|---|---|
| 3,317,311 | 5/1967 | Davey | 75—78 |
| 1,274,249 | 7/1918 | de Saulles | 75—88 |
| 1,687,188 | 10/1928 | Williams | 75—79 |
| 2,061,251 | 11/1936 | Perkins | 75—88 X |
| 2,461,280 | 2/1949 | Isbell | 75—63 X |
| 2,671,725 | 3/1954 | Robson et al. | 75—88 |
| 2,781,257 | 2/1957 | Wilkins | 75—88 |
| 2,101,975 | 12/1937 | Betterton et al. | 75—78 |
| 2,109,144 | 2/1938 | Betterton et al. | 75—78 |
| 2,613,074 | 10/1952 | Woods | 266—15 |
| 3,065,958 | 11/1962 | Cerych et al. | 266—15 |

FOREIGN PATENTS

| | | |
|---|---|---|
| 257,075 | 8/1963 | Australia. |
| 788,525 | 1/1958 | Great Britain. |

DAVID L. RECK, *Primary Examiner.*

H. W. TARRING, *Assistant Examiner.*